United States Patent
Schumann et al.

(10) Patent No.: US 9,318,772 B2
(45) Date of Patent: Apr. 19, 2016

(54) ADDITIVES FOR LITHIUM-ION ACCUMULATORS

(75) Inventors: Bernd Schumann, Rutesheim (DE); Martin Holger Koenigsmann, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1045 days.

(21) Appl. No.: 12/451,808

(22) PCT Filed: May 16, 2008

(86) PCT No.: PCT/EP2008/056058
§ 371 (c)(1), (2), (4) Date: May 7, 2010

(87) PCT Pub. No.: WO2008/151902
PCT Pub. Date: Dec. 18, 2008

(65) Prior Publication Data
US 2010/0221605 A1    Sep. 2, 2010

(30) Foreign Application Priority Data
Jun. 15, 2007    (DE) .......................... 10 2007 027 666

(51) Int. Cl.
*H01M 10/0525* (2010.01)
*H01M 10/0567* (2010.01)
*H01M 10/0568* (2010.01)
*H01M 10/42* (2006.01)

(52) U.S. Cl.
CPC ...... *H01M 10/0525* (2013.01); *H01M 10/0567* (2013.01); *H01M 10/0568* (2013.01); *H01M 10/4235* (2013.01); *H01M 2300/0025* (2013.01); *Y02E 60/122* (2013.01); *Y02T 10/7011* (2013.01)

(58) Field of Classification Search
CPC ..................... H01M 10/0525; H01M 10/0567; H01M 10/0568; H01M 10/4235; H01M 2300/0025; Y02E 60/122; Y02T 10/7011
See application file for complete search history.

(56) References Cited

U.S. PATENT DOCUMENTS

| 3,533,853 A | * | 10/1970 | Gabano ......................... 429/337 |
| 3,542,602 A | | 11/1970 | Gabano |
| 3,915,743 A | | 10/1975 | Lauck |
| 5,169,736 A | * | 12/1992 | Bittihn et al. .................. 429/300 |

(Continued)

FOREIGN PATENT DOCUMENTS

| DE | 12 16 394 | 5/1966 |
| DE | 1 671 912 | 11/1971 |

(Continued)

OTHER PUBLICATIONS

Sigma-Aldrich. Tetrahydrofuran Specification Comparison, 2006.*
(Continued)

Primary Examiner — Carlos Barcena
(74) Attorney, Agent, or Firm — Kenyon & Kenyon LLP

(57) ABSTRACT

A lithium-ion accumulator includes an anode, a cathode, a separator, and an electrolyte which is in connection with the anode and the cathode, which electrolyte includes at least one lithium salt as electrolyte salt and a solvent solubilizing the at least one lithium salt. The at least one lithium salt reacts with water to form an hydrogenous acid, and the electrolyte includes at least one additive, which reacts with the hydrogenous acid to form a compound acting as electrolyte salt.

6 Claims, 1 Drawing Sheet

(56) References Cited

U.S. PATENT DOCUMENTS

| | | | |
|---|---|---|---|
| 6,045,945 A * | 4/2000 | Hamamoto et al. | 429/200 |
| 6,045,948 A * | 4/2000 | Wang et al. | 429/231.95 |
| 6,379,846 B1 * | 4/2002 | Terahara et al. | 429/344 |
| 2003/0190530 A1 | 10/2003 | Yang et al. | |
| 2006/0269844 A1 * | 11/2006 | Deng et al. | 429/325 |

FOREIGN PATENT DOCUMENTS

| | | | |
|---|---|---|---|
| DE | 199 51 804 | 5/2001 | |
| DE | 101 03 189 | 7/2002 | |
| DE | 697 20 777 | 3/2004 | |
| EP | 0 903 798 | 3/1999 | |
| EP | 0 947 027 | 10/1999 | |
| GB | 1 211 773 | 11/1970 | |
| JP | 02 262270 | 10/1990 | |
| JP | 2-262271 | 10/1990 | |
| JP | 11-121034 | 4/1999 | |
| JP | 11121034 A * | 4/1999 | H01M 10/40 |
| JP | 11-149943 | 6/1999 | |
| JP | 2000-138072 | 5/2000 | |
| JP | 2000 182664 | 6/2000 | |
| JP | 2001-506052 | 5/2001 | |
| JP | 2002-343364 | 11/2002 | |
| JP | 2003-96031 | 4/2003 | |
| JP | 2003-272703 | 9/2003 | |
| JP | 2005 063717 | 3/2005 | |
| JP | 2005-71617 | 3/2005 | |
| JP | 2006 019070 | 1/2006 | |
| JP | 2007 115527 | 5/2007 | |
| WO | WO 2006/101779 | 9/2006 | |

OTHER PUBLICATIONS

H. S. Lee et al.: "Synthesis of a Series of Fluorinated Boronate Compounds and Their Use as Additives in Lithium Battery Electrolytes," Journal of the Electrochemical Society, vol. 151, No. 9, Jan. 1, 2004, pp. A1429-A1435.

* cited by examiner

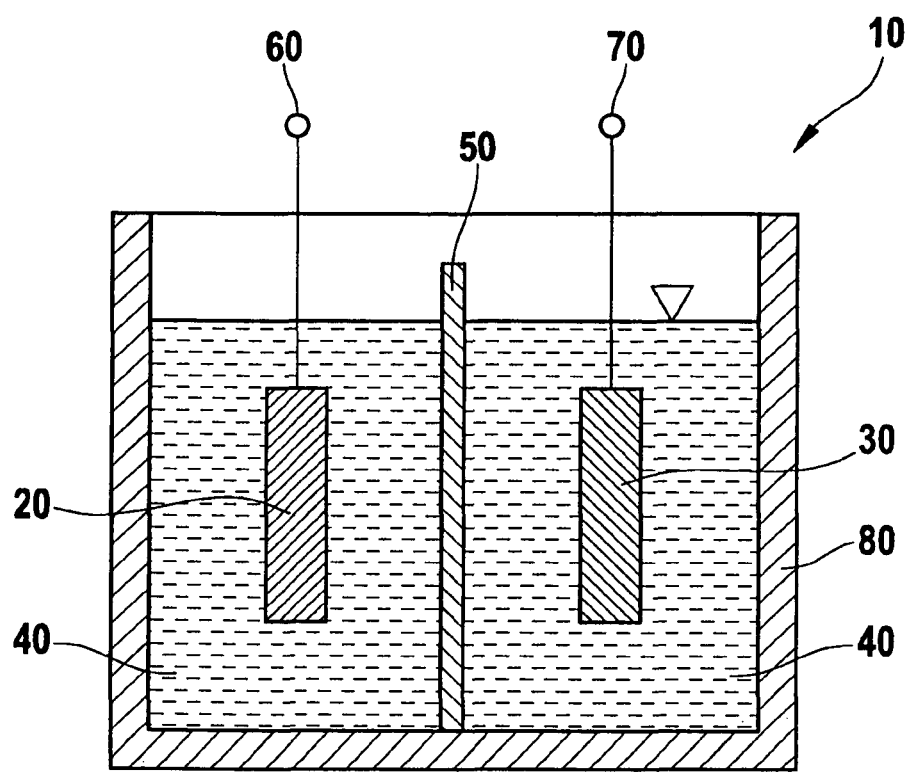

ADDITIVES FOR LITHIUM-ION ACCUMULATORS

BACKGROUND OF THE INVENTION

1. Field of the Invention

The present invention relates to lithium-ion accumulators which include an electrolyte containing at least one electrolyte salt in a solvent and at least one additive. Furthermore, the present invention also relates to a method for preventing the decomposition of active electrode material.

2. Description of Related Art

In many sectors, e.g., in mobile phones, camcorders and laptop computers, but lately also in electric vehicles and electro-hybrid vehicles, lithium-ion accumulators are used as rechargeable electrochemical voltage source. The multitude of application fields leads to increasing demand for improved, highly reliable lithium-ion accumulators which have a high energy density and sufficiently long service life representable by the number of charge and discharge cycles. Known lithium-ion accumulators currently have a relatively short service life of approximately three to five years. An exception are accumulators for special application fields, e.g., for space technology.

Conventional lithium-ion accumulators include a cathode (positive electrode), an anode (negative electrode), a separator situated in-between, which separates the oppositely charged electrodes from each other, and an electrolyte, which establishes the electric connection between the positive and negative electrodes spaced apart from each other, and which may be employed in the form of a liquid electrolyte or a gel electrolyte.

Liquid electrolytes used in lithium-ion accumulators typically include a lithium salt, which is solubilized in one or a plurality of solvents, typically nonaqueous, aprotic organic solvents. When using an accumulator, lithium ions ($Li^+$) are transported from the negative electrode (anode) to the positive electrode (cathode) through the electrolyte during the discharge, and electric energy is released in the process. The flow of the lithium ions is reversed during charging, the ions being transferred from the cathode through the electrolyte, back to the anode. In general, the anode and cathode of a lithium-ion accumulator include an active anode or cathode material that is suitable for the method of functioning of the accumulator, which material is electrochemically active and suitable for absorbing lithium ions, as well as a binding agent and a conductive material.

Already known are accumulators of the type referred to as "rocking chair", in which a carbon material, e.g., graphite, is used as anode material, which during the charge operation is capable of intercalating (incorporating) lithium ions at the intercalation locations of its lattice planes formed by carbon atoms in the shape of six-membered rings. Typically, a lithium intercalation material such as $LiCoO_2$, $LiNiO_2$ or $LiMn_2O_4$, which is capable of deintercalation (removal) of the lithium ions from their intercalation locations, is used as active cathode material, so that lithium ions move back and forth between the interstitial electrodes during the charge/discharge cycles.

Typical electrolytes of such lithium-ion accumulators include one or more lithium-containing electrolyte salts in a solvent, i.e., a lithium cation having an anion. Examples of such electrolyte salts are $LiClO_4$, $LiI$, $LiSCN$, $LiBF_4$, $LiAsF_6$, $LiCF_3SO_3$, $LiPF_6$ and the like.

In such accumulators it is important that impurities, which can affect the accumulator capacity, are removed to the greatest extent possible. For example, the reaction of the lithium, which moves between the electrodes, with impurities causes a passivation layer to form on the anode. This consumption of the lithium reduces the capacity of the accumulator. Another possible reason for the capacity drop of a lithium-ion accumulator can be traced to an undesired reaction of the water that is present, with the components of the electrolyte included in the accumulator. For example, published U.S. patent application document 2003/0190530 describes the reciprocal effect of water with $LiPF_6$, which is known as a typical electrolyte salt. Due to the resulting reciprocal effect, the internal resistance of the accumulator rises as a result of the decrease in the quantity of conductive components, gas and oxidizing substances being produced as well.

Published European patent document EP 0 947 027 describes a reaction of the water present in the accumulator with the electrolyte or with the lithium salt solubilized in a solvent. The water reacts with the solubilized lithium salt while forming a hydrogenous acid, which subsequently is able to cause an acid oxidation (acid attack) of the active cathode material, in particular when the cathode material is a lithium metal oxide. This acid oxidation leads to a decomposition of the active cathode material, during which water is produced once again, which is then able to react anew with the lithium salt of the electrolyte. In so doing, the acid environment is increased further. A chain reaction therefore results, which causes a cumulative corrosion of the active cathode material. The produced decomposition reaction is not related to the quantity of contaminating water initially present in the accumulator, but theoretically continues for as long as reagents can be produced from the active cathode material. Published European patent document EP 0 947 027 describes a composition of a lithium-ion cell and a method for preventing the decomposition of one or more components contained therein. By incorporating an additive, e.g., an alkaline compound, which represents an electron donor, a portion of the produced hydrogenous acid is neutralized by reacting with this donor. The alkaline compound may be added to the active material of the cathode, or it may be added to the electrolyte solution as additive, the additive being mixable with the electrolyte solution or being soluble therein. Such alkaline compounds are, among others, carbonates, metal oxides such as aluminates, hydroxides, amines, organic bases and silicates on lithium basis. The fact that the share of active cathode material is reduced by the incorporation of the additive, which thereby reduces the capacitance of the accumulator, has been shown to be disadvantageous. In the same way, interference with transport processes to and inside the electrodes may occur. Since these additives become effective as interceptors only when the electrode is attacked, important cover layers as well as the electrode surface may be damaged.

BRIEF SUMMARY OF THE INVENTION

The lithium-ion accumulator according to the present invention has an anode, a cathode, a separator and an electrolyte, which is in contact with the anode and the cathode and includes at least one lithium salt as electrolyte salt, and a solvent solubilizing the at least one lithium salt, the at least one lithium salt reacting with water to form a hydrogenous acid. The electrolyte contains at least one additive, which reacts with the hydrogenous acid to form a compound which functions as electrolyte salt.

One advantage of the present invention is that it minimizes the known undesired reciprocal effects initiated by contaminating water. The concentration of the produced hydrogenous acid is therefore restricted, which means that the properties of the lithium-ion accumulator with regard to capacitance, stability and service life are kept at a high level. The decomposition of the active material of the cathode by the produced hydrogenous acid, which constitutes the largest contribution to the decrease in the accumulator capacitance, especially in the case of lithium manganese oxide as active cathode material, is largely prevented.

It is also advantageous that further after-effects of the decomposition process of the active cathode material are avoided, such as the production of more water, the generation of gaseous products, for example by the reduction of water at the anode to hydrogen gas, the decomposition of additional accumulator components, e.g., the electrolyte solvent.

It is advantageous that the method according to the present invention prevents an acid attack on the active cathode material through the admixture of an additive, in that the produced hydrogenous acid largely reacts with the additive. It is especially advantageous that the additive enters into a combination with the produced hydrogenous acid, which combination acts as an additional electrolyte salt in the electrolyte of the lithium-ion accumulator and thus advantageously supports the ionic conductivity of the electrolyte. This not only extends the service life of such an accumulator, but its capacitance remains at virtually the same high level as well.

Moreover, it is advantageous that the additive agent is not added to the active material of the cathode, thereby avoiding a reduced output resulting from a reduction of the active cathode material, and interference with transport processes inside the electrode.

It is advantageous that the additive is added to the electrolyte as soluble additive, so that it is accessible to all components in the accumulator and has high mobility.

In contrast to the related art, the method according to the present invention has the advantage that it not only effectively blocks the reaction mechanism of the acid attack on the active cathode material and its corrosion, but that the produced hydrogenous acid is trapped before a potential reciprocal effect with the active cathode material takes place in the electrolyte. Therefore, the additive agent in its ionic form need not be intimately connected or in intimate relation to the individual components of the active cathode material containing the lithium metal oxide.

BRIEF DESCRIPTION OF THE DRAWING

FIG. 1 shows a lithium-ion accumulator.

DETAILED DESCRIPTION OF THE INVENTION

FIG. 1 shows a general structure of a lithium-ion accumulator 10. Situated in a housing 80 is an anode 20, which includes active anode material, and situated across from it is a cathode 30 which includes active cathode material. Present in-between is a liquid electrolyte 40, which is in contact with anode 20 and cathode 30, and a separator 50, which prevents the occurrence of internal short-circuits between electrodes 20 and 30 by keeping the positive and negative electrodes 20, 30 at a distance and electrically insulated from each other. Liquid electrolytes 40 typically include a solvent, a lithium-containing salt and, according to the present invention, an additive and possibly a base. Anode 20 is connected to an anode connection 60, and cathode 30 to a cathode connection 70.

The decrease in the accumulator's capacitance over time is a function of the active cathode material used. If lithium manganese oxide is used as active cathode material, then an obvious reduction of the capacitance over time is noticeable, whereas this decrease is less pronounced in the case of lithium cobalt oxide. This is attributed to the relative susceptibility of lithium manganese oxide to an acid attack. In the case of lithium manganese oxide, the corrosion attack of the produced compounds, e.g., the hydrogenous acid, leads to further reciprocal effects of other components of the accumulator with the generated compounds, which result in a reduced quantity of the available electrolyte salt and thus initiate a decrease in the capacitance. The observed reduction in capacitance of a lithium-ion accumulator 10 over time, in particular with lithium manganese oxide as active cathode material, may be attributed to undesired reactions between impurities in electrochemical accumulator 10 and in cell components. Water, in particular, is to be mentioned as impurity.

In practice, it is difficult to produce an accumulator 10 completely without water. Especially when the cell components contain the water not only on the surface but the water is present in fixedly combined form instead, a residual quantity of water will remain in accumulator 10. Even very small quantities of water start a reaction of the water with an electrolyte salt solubilized in electrolyte 40 while forming a hydrogenous acid in the process. The produced hydrogenous acid consequently reacts with the active cathode material, especially lithium manganese oxide, which breaks down cathode 30. The acid breakdown of cathode 30 is accompanied by the renewed production of water. The produced water can then react with additional solubilized electrolyte salt, whereby additional acid is produced, the acid environment is increased further, and the active cathode material corrodes more and more. This leads to a decomposition of the active cathode material on the one hand, and the cumulative reaction of the electrolyte salt containing lithium ions entails a reduction of the ionic conductivity of electrolyte 40 on the other. Moreover, the decomposition of the electrolyte solvent produces gaseous species through a reduction of water at anode 20.

The present invention utilizes a lithium-ion accumulator 10 having a cathode 30, which includes a cathode accumulator, an active cathode material, a conductive material, and a binder. For example, a mixture of an active cathode material and powdery carbon is applied on a foil made of a conductive material such as Ni, Ti, Al, Pt, V, Au, Zn or alloys thereof, in order to improve the conductivity. A suitable active cathode material also contains removable lithium. It is selected from the group of the lithium compounds having a layer structure, e.g., lithium cobalt oxide ($LiCoO_2$), lithium nickel oxide ($LiNiO_2$), lithium cobalt nickel oxide ($LiNi_{1-x}Co_xO_2$), lithium nickel cobalt manganese oxide ($Li(NiCoMn)_{1/3}O_2$), lithium nickel cobalt aluminum oxide ($LiNi_xCo_yAl_{1-x-y}O_2$), lithium iron oxide ($LiFeO_2$), lithium manganese dioxide ($LiMnO_2$), from the group of the lithium-containing spinels, e.g., lithium manganese oxide ($LiMn_2O_4$), mixed oxides of the lithium manganese oxide ($LiM_xMn_{2-x}O_4$), and from the group of the lithium-containing olivines, e.g., lithium iron phosphate (Li—$FePO_4$), lithium manganese phosphate ($LiMnPO_4$), lithium cobalt phosphate ($LiCoPO_4$), lithium nickel phosphate ($LiNiPO_4$) or similar substances. Lithium cobalt oxide, lithium nickel oxide, lithium cobalt nickel oxide, lithium nickel cobalt manganese oxide, lithium nickel cobalt aluminum oxide, lithium manganese oxide, lithium iron phosphate and lithium manganese phosphate are preferred.

A utilized anode 20 includes a carbon applied on a conductive material, e.g., in the form of amorphous non-graphite coke or graphite, preferably graphite in which lithium ions are able to be incorporated in reversible manner. Also suitable are alloys of lithium including silicon or tin, possibly in a carbon matrix, lithium metal and lithium titanate.

Electrolyte 40 of lithium-ion accumulator 10 according to the present invention includes a non-aqueous aprotic organic solvent. These solvents are characterized by long-lasting stability, especially within the temperature and voltage range prevailing inside accumulator 10, ion conductivity, solubility with regard to lithium electrolyte salts, reliability and excellent wetting capabilities. Liquid aprotic organic solvents such as ether, e.g., dimethoxymethane, dimethoxyethane, diethoxyethane and tetrahydrofurane, carbonate, e.g., ethylene carbonate, propylene carbonate, dimethyl carbonate, diethyl carbonate, and ethyl methyl carbonate, or esters, e.g., ethylacetate and gamma butyrolactone, are used in lithium-ion accumulators. A solvent which includes a mixture of ethylene carbonate and dimethyl carbonate is preferred.

Before the solvents are filled into accumulator 10, possibly present water is removed from the used aprotic organic solvents to the greatest extent possible by rectification and drying steps. Nevertheless, a water content of a few ppm up to 1,000 ppm may remain in the solvent.

Used as electrolyte salts are lithium ions ($Li^+$) having a Lewis acid anion such as, for example, $BF_4^-$, $PF_6^-$, $ClO_4^-$, $CF_3SO_4^-$ or $BPh_4^-$ (Ph denoting a phenyl group), and mixtures of the mentioned salts in one of the aforementioned aprotic solvents. Preferably used as electrolyte salt is $LiPF_6$, which is easily solubilized in the preferred solvent, which contains ethylene carbonate and dimethyl carbonate.

The goal is to use all components of a lithium-ion accumulator 10 without water, if possible, but this is not fully successful. It has been shown that a residual water content remains in a lithium-ion accumulator 10. The residual content of the water, which reaches the interior of the accumulator predominantly through the electrolyte including electrolyte salt and solvent, and via water adhering to the surfaces of electrodes and separator, lies within a range of 100 to 1,000 ppm. This residual content is a function of the cell chemistry employed and the manufacture of the accumulator. The water present initiates the previously described reciprocal effects with the accumulator components. For example, the lithium electrolyte salt $LiPF_6$ according to reaction equation I:

$$LiPF_6 + H_2O \rightarrow 2HF + POF_3 + LiF \quad (I)$$

has a tendency toward a strong reciprocal effect with water while forming hydrogen fluoride (HF). If the produced hydrogen fluoride is present as gas, then this will lead to an increase in the internal pressure of accumulator 10.

The generated hydrogen fluoride is normally present in the electrolyte in dissolved form due to its excellent solubility. It is assumed that $POF_3$ likewise goes into solution, which causes phosphoric acid to form. The produced acids corrode the active cathode material, so that, for example, Li and Mn ions are removed from it.

According to the present invention, in addition to the solvent and the electrolyte salt solubilized therein, electrolyte 40 includes an additive, which enters into a reciprocal action with the acids generated according to the reaction equation I, especially the hydrogen fluoride, and thus binds the acids.

In one example embodiment of the present invention, the additive is selected from the Lewis acids group. The additives, which act as hydrogen fluoride trapper in an accumulator, enter into a Lewis acid base reaction with the produced hydrogen fluoride. They are selected from the group of the compounds of main group III, main group IV and main group V, denoted according to the old nomenclature.

Suitable compounds of main group III are homogenous or mixed coordinated compounds of the general form MXYZ with:

M being an element of main group III;
X, Y and Z being selected from the group of:
halogens such as F, Cl, Br, I;
cyano group (CN);
carbonyl group (CO);
amine of the general form $NR^1R^2R^3$ with $R^1$, $R^2$, $R^3$ selected independently of one another from the group including H, branched and/or unbranched alkyl chains with $C_1$-$C_{18}$, branched and/or unbranched, mono- or polyunsaturated $C_1$-$C_{18}$, the $C_1$-$C_{18}$ residual also including cyclical structures and/or ether groups.

Fluorine-containing compounds of main group III, such as $BF_3$, $AlF_3$, $GaF_3$, $InF_3$, $TlF_3$ are preferred. The hydrogen fluoride formed by the reciprocal effect of the water impurity with the electrolyte salt reacts with the additive according to the present invention, e.g., bortrifluoride, in a Lewis acid base reaction according to a reaction equation III:

$$HF + BF_3 \rightarrow H^+ + BF_4^- \quad (II).$$

In one example embodiment, complexes of the aforementioned compounds of main group III are used as additive.

In one example embodiment, complexes of bortrifluoride are used as additive, such as complexes with ethers of the general form $R^1OR^2$ with $R^1$, $R^2$ selected independently of each other from the group of branched and/or unbranched alkyl chains with $C_1$-$C_{18}$, branched and/or unbranched, mono- or polyunsaturated $C_1$-$C_{18}$, the $C_1$-$C_{18}$ residual also including cyclical structures and/or ether groups. In one specific embodiment, the ether is also part of the electrolyte.

In one further example embodiment, complexes of the bortrifluoride having amines of the general form $NR^1R^2R^3$ are used as additive, $R^1$, $R^2$, $R^3$ being selected independently of each other from the group including H, branched and/or unbranched alkyl chains with $C_1$-$C_{18}$, branched and/or unbranched, mono- or polyunsaturated $C_1$-$C_{18}$, the $C_1$-$C_{18}$ residual also including cyclical structures and/or ether groups.

In this way a quaternary $BF_4$ salt, which has an excellent ion conductivity, is produced in the reaction of a bortrifluoride complex with hydrogen fluoride. The salt produced in this way increases the overall ion conductivity of the electrolyte in lithium-ion accumulator 10, as reproduced in reaction equation III by way of example, Et being an ethyl group:

$$HF + NEt_3 - BF_3 \rightarrow NHEt_3^+ + BF_4^- \quad (III).$$

In one further example development of the present invention, an additive from the group of the compounds from main group IV is selected, e.g., compounds with fluor, chlorine, bromine or iodine. Examples of fluorine-containing compounds are $SiF_4$, $GeF_4$, $SnF_4$, $PbF_4$. Silicon tetrafluoride ($SiF_4$), for example, reacts with the produced hydrogen fluoride according to reaction equation IV:

$$SiF_4 + 2HF \rightarrow H_2(SiF_6) \quad (IV)$$

to form fluorosilicic acid, which does not act as conductive salt in the accumulator. However, according to the present invention, the addition of a base produces a conductive salt according to reaction equation V, which increases the ion conductivity in accumulator 10. Preferably, an amine is used as base, of the general form $NR^1R^2R^3$ with $R^1$, $R^2$, $R^3$ being selected independently of each other from the group including H, branched and/or unbranched alkyl chains with $C_1$-$C_{18}$, branched and/or unbranched, mono- or polyunsaturated $C_1$-$C_{18}$, the $C_1$-$C_{18}$ residual also including cyclical structures and/or ether groups. Preferably used is an amine in which $R^1$, $R^2$ and $R^3$ are identical.

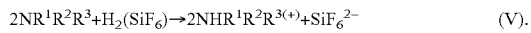
$$2NR^1R^2R^3 + H_2(SiF_6) \rightarrow 2NHR^1R^2R^{3(+)} + SiF_6^{2-} \quad (V).$$

In one further example embodiment of the present invention, an additive from the group of the compounds from main group V is selected. Compounds of main group V are homogenous or mixed coordinated compounds of the general form MVXYZ with:
- M being an element of main group;
- V, X, Y and Z being selected from the group of:
  - halogens such as F, Cl, Br, I;
  - cyano group (CN);
  - carbonyl group (CO);
  - amine of the general form $NR^1R^2R^3$ with $R^1$, $R^2$, $R^3$ selected independently of one another from the group including H, branched and/or unbranched alkyl chains with $C_1$-$C_{18}$, branched and/or unbranched, mono- or polyunsaturated $C_1$-$C_{18}$, the $C_1$-$C_{18}$ residual also including cyclical structures and/or ether groups. Fluorine-containing compounds of main group V such as $PF_5$, $AsF_5$, $SbF_5$, $BiF_5$ are preferred.

The produced hydrogen fluoride reacts with the additive according to the present invention in a Lewis acid base reaction as illustrated in reaction equation VI using the example of phosphorus pentafluoride:

$$HF + PF_5 \rightarrow H^+ + PF_6^- \quad (VI).$$

In one example embodiment, complexes of the aforementioned compounds of main group V are used.

In one example embodiment, complexes of the fluorine-containing compounds of main group V are used as additive. Pertinent examples are complexes with ethers of the general form $R^1OR^2$ with $R^1$, $R^2$ being selected independently of each other from the group of branched and/or unbranched alkyl chains with $C_1$-$C_{18}$, branched and/or unbranched mono- or polyunsaturated $C_1$-$C_{18}$, the $C_1$-$C_{18}$ residual also including cyclical structures and/or ether groups. In one specific embodiment, the ether is also part of the electrolyte.

In one further example embodiment, complexes of the fluorine-containing compounds of main group V including amines of the general form $NR^1R^2R3$ are used as additive, $R^1$, $R^2$, $R^3$ being selected independently of each other from the group including H, branched and/or unbranched alkyl chains with $C_1$-$C_{18}$, branched and/or unbranched, mono- or polyunsaturated $C_1$-$C_{18}$, the $C_1$-$C_{18}$ residual also including cyclical structures and/or ether groups. Preferably used is an amine in which $R^1$, $R^2$ and $R^3$ are identical.

Using the example of a phosphorus pentafluoride complex, the reaction with hydrogen fluoride is illustrated in reaction equation VII:

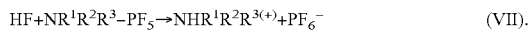
$$HF + NR^1R^2R^3 - PF_5 \rightarrow NHR^1R^2R^{3(+)} + PF_6^- \quad (VII).$$

The additive according to the present invention may be admixed to electrolyte 40 during its production. In one specific embodiment, the additive is added together with the lead salt of electrolyte 10 during the formulation, and electrolyte 40 produced in this manner is filled into accumulator 10. In one additional specific embodiment, the additive serving as acid trapper may be directly introduced into electrolyte 40 situated in accumulator 10.

The quantity of the additive depends on the estimated quantity of water present in a lithium-ion accumulator 10 and should exceed it by at least five times. The quantity of the additive should not change the acidity of accumulator 10 to any significant degree. The concentration of the additive is based on the type of lithium-ion accumulator and lies in a range from 0.1 to 15 vol. %.

The additive is preferably electrochemically stable in the temperature and voltage range in which accumulator 10 is used. The additive should not cause any side effects that affect the method of functioning of accumulator 10.

According to the present invention, a method is also provided by which the corrosion of the active material of electrodes 20, 30 is prevented, and the acid that forms through a reaction with at least one additive is trapped, comprising the steps:
- providing an electrolyte (40), including a lithium salt as electrolyte salt and a solvent solubilizing the lithium salt;
- producing an hydrogenous acid by reaction of the solubilized lithium salt with present water;
- providing at least one additive in the electrolyte, which reacts with the produced hydrogenous acid to form an electrolyte salt.

In summary, the present invention provides a lithium-ion accumulator in order to prevent or minimize the corrosion of cathode 30 observed especially with lithium manganese oxide as active cathode material. Moreover, the additive according to the present invention facilitates the ion conductivity of electrolyte 40 present in accumulator 10 due to its reciprocal effect with the previously produced acid. To interrupt the corrosion, an additive is provided, which enters into a reciprocal action with the produced hydrogenous acid produced from the reaction of the electrolyte salt solubilized in electrolyte 40, with the water present in accumulator 10. The reciprocal effect of the hydrogenous acid with the additive results in a quaternary salt, which has excellent ion conductivity, thereby not only interrupting the corrosion but also keeping the conductivity of electrolyte 40 at a high level. The cations and anions of the Lewis acid base complexes being used as additives according to the present invention normally exhibit excellent solubility in electrolyte 40. The presence of the relatively large Lewis acid base complexes increases the mobility of the very small lithium cations of the accumulator, which are carriers of the charge, which improves the conductivity.

What is claimed is:

1. A lithium-ion accumulator, comprising:
an anode;
a cathode;
a separator; and
an electrolyte in contact with the anode and the cathode, the electrolyte including:
at least one lithium salt as a first electrolyte salt;
a solvent solubilizing the lithium salt, the solubilized electrolyte salt reacting with water to form at least one hydrogenous acid; and
at least one additive which reacts with the at least one hydrogenous acid to form a compound acting as a second electrolyte salt; wherein the additive is a compound of the form MXYZ, M being a complex including an element selected from the group consisting of elements of main group III, and X, Y, and Z each being selected from the group consisting of:
(a) a halogen selected from the group consisting of bromine and iodine;
(b) a cyano group;
(c) a carbonyl group; and
(d) an amine of the form $NR^1R^2R^3$, and each of $R^1$, $R^2$, and $R^3$ being selected from the group consisting of:
(i) hydrogen;
(ii) at least one of branched and unbranched alkyl chains with $C_1$-$C_{18}$; and (iii) at least one of branched and unbranched alkyl, mono- or polyunsaturated with $C_1$-$C_{18}$, wherein the $C_1$-$C_{18}$ residual includes at least one of a cyclical structure and an ether group.

2. The lithium-ion accumulator as recited in claim 1, wherein the at least one additive includes a Lewis acid.

3. The lithium-ion accumulator as recited in claim 2, wherein the additive is added to the electrolyte during its formulation.

4. The lithium-ion accumulator as recited in claim 1, wherein the additive includes an ether group having the general form $R^1OR^2$, with $R^1$ and $R^2$ being selected independently of each other from the group including: at least one of branched and unbranched alkyl chains with $C_1$-$C_{18}$; and at least one of branched and unbranched, mono- or polyunsaturated $C_1$-$C_{18}$, the $C_1$-$C_{18}$ residual also including at least one of cyclical structures and ether groups.

5. The lithium-ion accumulator as recited in claim 1, wherein the additive includes an amine group having the general form $NR^1R^2R^3$, with $R^1$, $R^2$ and $R^3$ being selected independently of each other from the group including: H; at least one of branched and unbranched alkyl chains with $C_1$-$C_{18}$; at least one of branched and unbranched, mono- or polyunsaturated $C_1$-$C_{18}$, the $C_1$-$C_{18}$ residual also including at least one of cyclical structures and ether groups.

6. A lithium-ion accumulator, comprising:
an anode;
a cathode;
a separator; and
an electrolyte in contact with the anode and the cathode, the electrolyte including:
at least one lithium salt as a first electrolyte salt;
a solvent solubilizing the lithium salt, the solubilized electrolyte salt reacting with water to form at least one hydrogenous acid; and
at least one additive which reacts with the at least one hydrogenous acid to form a compound acting as a second electrolyte salt; wherein the additive is a compound of the form MXYZ, M being a complex including an element selected from the group consisting of: gallium, indium, and thallium, and X, Y, and Z each being selected from the group consisting of:
(a) a halogen selected from the group consisting of bromine and iodine;
(b) a cyano group;
(c) a carbonyl group; and
(d) an amine of the form $NR^1R^2R^3$, and each of $R^1$, $R^2$, and $R^3$ being selected from the group consisting of:
(i) hydrogen;
(ii) at least one of branched and unbranched alkyl chains with $C_1$-$C_{18}$; and
(iii) at least one of branched and unbranched alkyl, mono- or polyunsaturated with $C_1$-$C_{18}$, wherein the $C_1$-$C_{18}$ residual includes at least one of a cyclical structure and an ether group.

\* \* \* \* \*